UNITED STATES PATENT OFFICE.

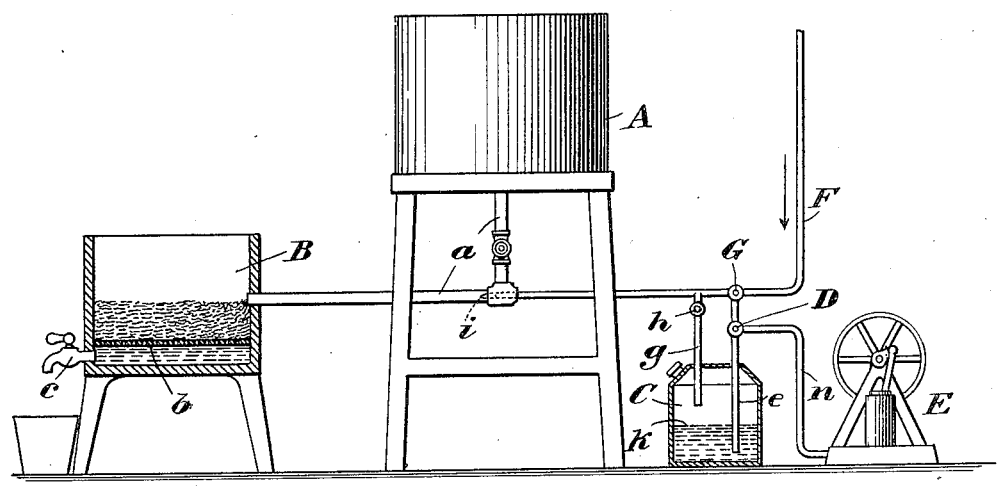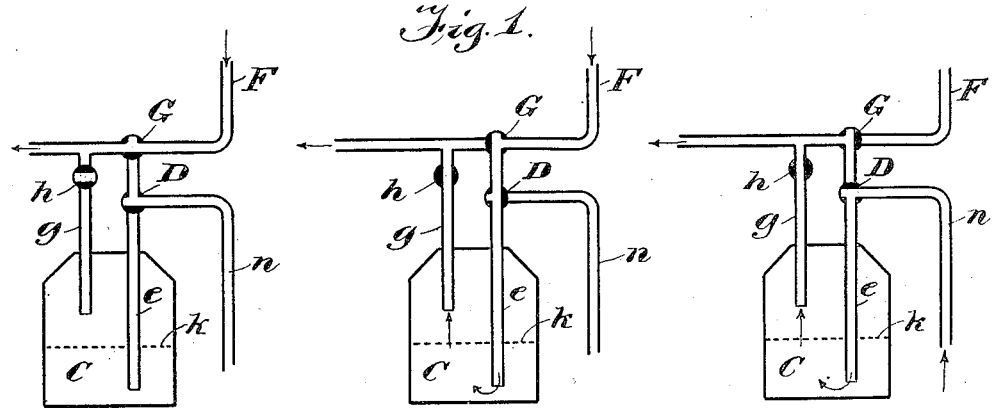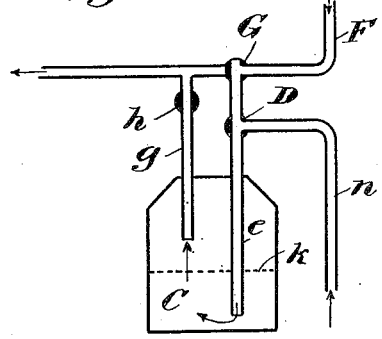

ROBERT HEAD, OF NEW YORK, N. Y., ASSIGNOR, BY MESNE ASSIGNMENTS, TO NATIONAL LAC CASEIN CO., OF PORTLAND, MAINE, A CORPORATION OF MAINE.

PROCESS OF SEPARATING CASEIN.

No. 917,062.     Specification of Letters Patent.     Patented April 6, 1909.

Application filed September 22, 1906, Serial No. 335,743. Renewed August 28, 1908. Serial No. 450,742.

*To all whom it may concern:*

Be it known that I, ROBERT HEAD, a citizen of the United States, residing at the city of New York, borough of Manhattan, in the county and State of New York, have invented a certain new and useful Process of Separating Casein, of which the following is a specification.

The object of my invention is to make casein from milk, in an economical and expeditious manner, and to produce a casein of superior quality.

The salient feature of the invention consists in effecting the coagulation of the casein by means of a fluid carrying an acid, though, in a modified form of my invention, I may dispense with the employment of the acid.

In practicing my invention I may employ various types of apparatus, and in the accompanying drawings I have illustrated one embodiment of an apparatus which I have found suitable for the purpose.

Figure 1 is an elevation, partly in section, of the apparatus; and Figs. 2, 3, 4, 5 and 6 show modified forms of the inlet and outlet connections to the acid container.

A is a milk vat or container, provided with a valved outlet pipe *a*, leading to a separating tank B, having a strainer *b*, and a draw-off cock *c* for the whey.

C is an acid, or other coagulating agent, receptacle, having a fluid inlet *e*, extending to near the bottom thereof, and provided with a three way valve D, and an outlet *g*, having a valve *h*.

E is a means for supplying air under pressure to the receptacle C, through the pipe, N, controllable by the valve D.

F is a steam pipe, leading from any suitable source of steam, provided with a three way valve G, whereby steam may be delivered to the acid receptacle C, or to the milk pipe *a*, leading to the separating tank B, the said steam pipe being provided, at or near its junction with the milk pipe *a*, with a reduced outlet *i*.

As shown in Fig. 2, the three way valve D is closed and the three way valve G open, so that steam, only, passes directly to the milk pipe, communication with the acid receptacle being shut off.

As shown in Fig. 3, the valve D is closed and the valve G, so positioned as to direct the steam into the receptacle C, and, after passing through the acid or other agent contained in the receptacle C, it escapes through the outlet pipe *g*, and enters the horizontal branch of the pipe F, whence it unites with the milk in the pipe *a*.

As shown in Fig. 4, the valve G is closed, and the valve D is open, thereby admitting a current of air, only, into the receptacle C, which, after passing through the acid therein, passes out through the outlet pipe *g*, and finally enters the milk pipe *a*, as previously described.

As shown in Fig. 5, the valves D and G are so positioned as to direct both steam and air into the receptacle C.

When the valves D and G are positioned as shown in Fig. 6, air enters the receptacle C, and after passing through the acid therein, it passes out through the pipe *g*, where it meets and unites with, a current of steam, the mixture thus produced entering the milk pipe *a*.

From the foregoing description of the apparatus, its operation will be readily understood from the following brief explanation: Hydrochloric, sulfuric or other acid, or coagulating agent, having been placed in the receptacle C, to about the level *k*, whereby the inlet pipe *e* dips below the surface thereof, but the outlet pipe *g* is above the surface, whereupon air, or steam, or a mixture of air and steam is admitted to the receptacle C. The particular fluid, agent, or agents, admitted to the receptacle C, takes up or absorbs some of the acid, or other casein coagulating agent therein, and upon coming in contact and mixing with the milk in the pipe *a*, produces a coagulation of the casein therein. The casein and whey are delivered to the tank B, the whey flowing through the strainer or filter leaving the separated casein on the strainer, from whence it may be removed and dried and powdered as is customary.

From the foregoing description it will be observed that the apparatus which I employ enables me to introduce steam only into the milk, Fig. 2; steam and acid, or other coagulating agent, Fig. 3; air and acid, Fig. 4; steam, air and acid, the steam and air entering passing through the acid, Fig. 5; or air and acid, mixed with steam, Fig. 6.

The particular coagulating agent employed will depend on the uses for which the casein is intended. If it is to be used for food purposes, I preferably employ hydrochloric acid; whereas, for general manufacturing purposes, I may employ sulfuric acid. If, however, it is desired to render the casein insoluble, I may employ formic aldehyde, or its solution, "formalin". It will be apparent, also, that I may employ a mixture or combination of coagulating agents.

The strength of the acid employed will depend on whether air only is being passed therethrough, or steam, only, or a mixture of the two, and, also, on the amount of casein in the milk. This is a matter, however, which those skilled in the art can regulate without difficulty, the aim being to use only sufficient acid to effect the result of coagulating all the casein.

While my process is particularly applicable to the treatment of "skimmed" milk, and "butter" milk, yet it can be used for the separation of casein from whole milk or from any other liquid containing it.

The employment of air, steam and coagulating agent, in the various ways described, enables me to control the speed of coagulation, the temperature at which the operation is conducted, and various other features of the process to a nicety.

It will be understood that the apparatus is provided with the necessary thermometers, pressure gages, and similar well known expedients commonly used in industrial processes.

Having described my invention, what I claim is:—

1. In the art of separating casein, the process which consists in commingling a liquid containing it with a fluid carrying steam and a coagulating agent.

2. In the art of separating casein, the process which consists in commingling a liquid containing it with a fluid carrying steam and an acid.

3. In the art of separating casein, the process which consists in commingling a liquid containing it with a gaseous agent carrying a coagulating agent.

4. In the art of separating casein, the process which consists in passing steam and air through a casein coagulating agent, and then commingling the liquid containing the casein with the resulting mixture of steam, air and coagulating agent.

5. In the art of separating casein, the process which consists in passing steam and air through an acid, and commingling the resulting mixture with a casein containing liquid.

6. In the art of separating casein, the process which consists in mixing air containing a casein coagulating agent with steam, and commingling a casein containing fluid with the resulting mixture.

7. In the art of separating casein, the process which consists in mixing air carrying an acid with steam, and commingling the resulting mixture with the milk.

In testimony whereof I have signed my name to this specification, in the presence of two subscribing witnesses.

ROBERT HEAD.

Witnesses:
 JAS. H. GRIFFIN,
 H. I. BERNHARD.